United States Patent [19]
Marteney et al.

[11] Patent Number: 5,704,756
[45] Date of Patent: Jan. 6, 1998

[54] TRAILER MOUNTED PERSONAL WATERCRAFT SUPPORT STRUCTURE

[75] Inventors: Steve M. Marteney, West Covina, Calif.; Ronald Garibaldi, 1356 E. Level, Covina, Calif. 91724

[73] Assignees: Runnerlift Corporation; Ronald Garibaldi, both of Covina, Calif.

[21] Appl. No.: 716,133

[22] Filed: Sep. 20, 1996

Related U.S. Application Data

[60] Provisional application No. 60/005,083 Oct. 11, 1995.
[51] Int. Cl.⁶ ................................................. B60P 1/02
[52] U.S. Cl. ................................... 414/495; 414/462
[58] Field of Search .................... 410/2, 26; 414/462, 414/482, 495, 659, 660, 785

[56] References Cited

U.S. PATENT DOCUMENTS

| | | | |
|---|---|---|---|
| 3,718,227 | 2/1973 | Swift | 414/495 |
| 3,720,334 | 3/1973 | Permut et al. | 414/462 |
| 3,885,689 | 5/1975 | Grove et al. | 414/462 |
| 3,989,265 | 11/1976 | Smiley. | |
| 4,003,485 | 1/1977 | Edgerton | 414/462 |
| 4,406,477 | 9/1983 | McDonald. | |
| 4,589,814 | 5/1986 | Cates | 414/495 |
| 4,705,289 | 11/1987 | Weber. | |
| 4,880,250 | 11/1989 | Cravens et al. | |
| 4,932,830 | 6/1990 | Woodburn. | |

*Primary Examiner*—Thomas J. Brahan
*Attorney, Agent, or Firm*—Watson Cole Stevens Davis, P.L.L.C.

[57] ABSTRACT

A movable structure is provided for supporting a motorized personal watercraft on a boat trailer on a platform elevated above the boat carried on the trailer. The structure is in the form of L-shaped bracket having horizontal legs engaged by elongated guide supports mounted transversely on the trailer undercarriage, and vertical legs supporting a movable platform for the personal watercraft.

3 Claims, 3 Drawing Sheets

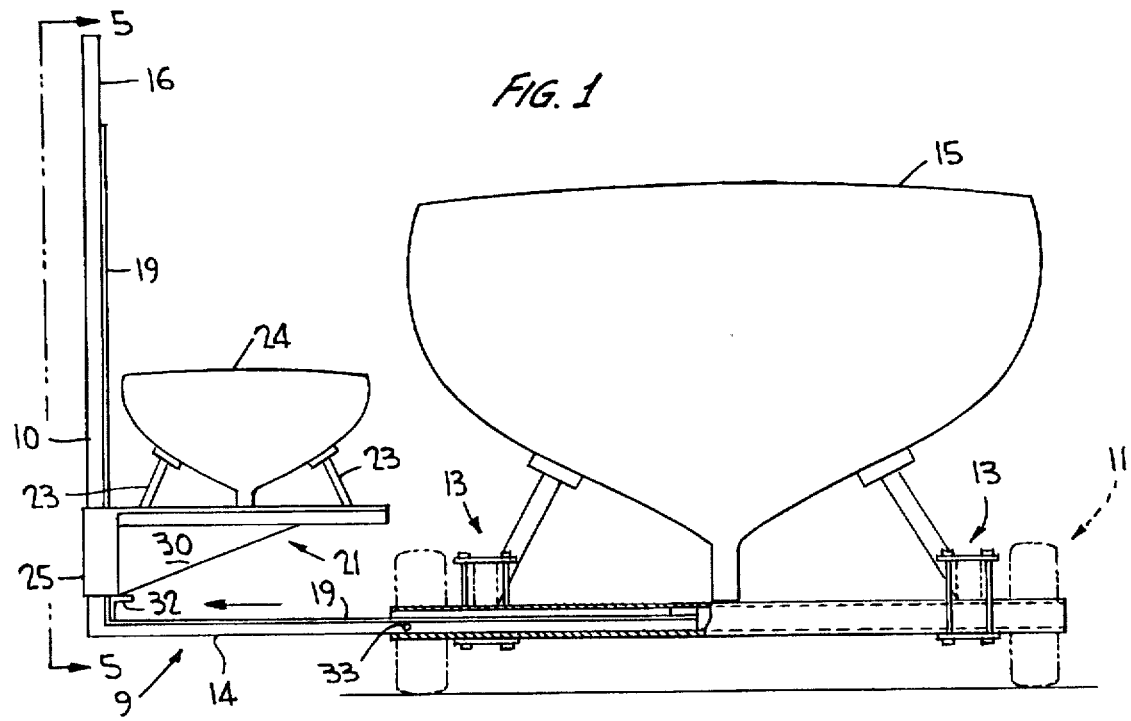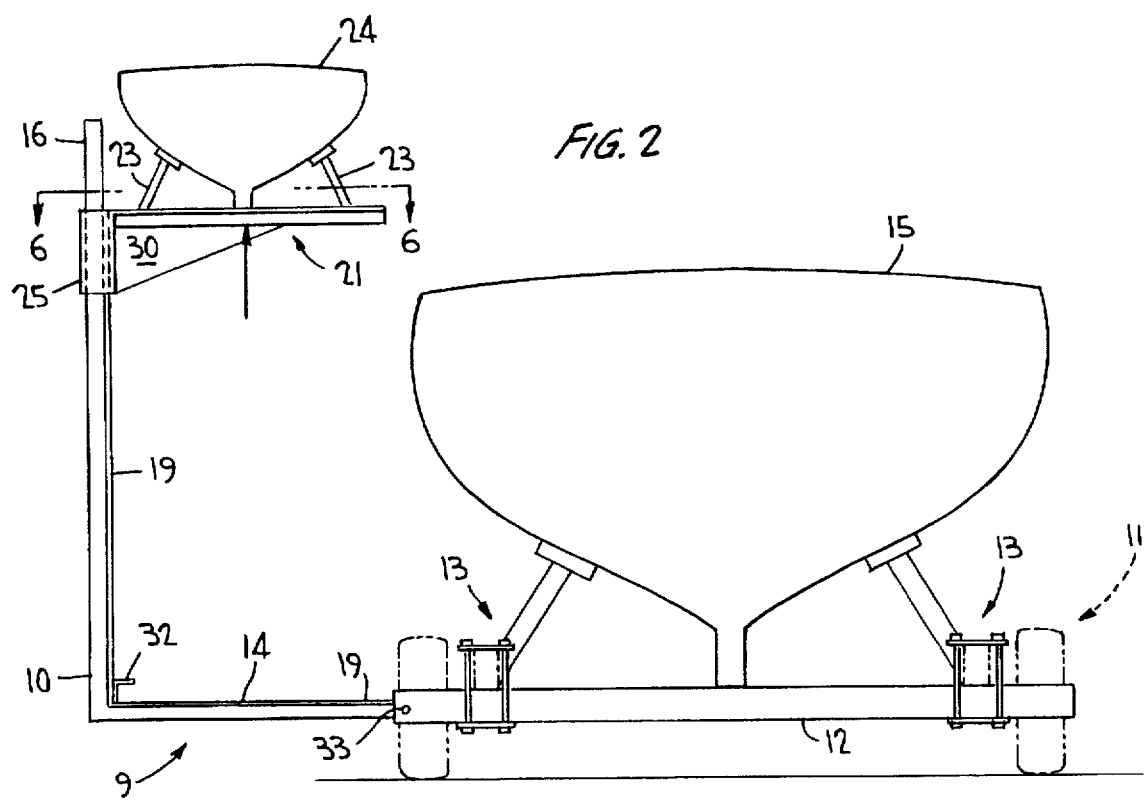

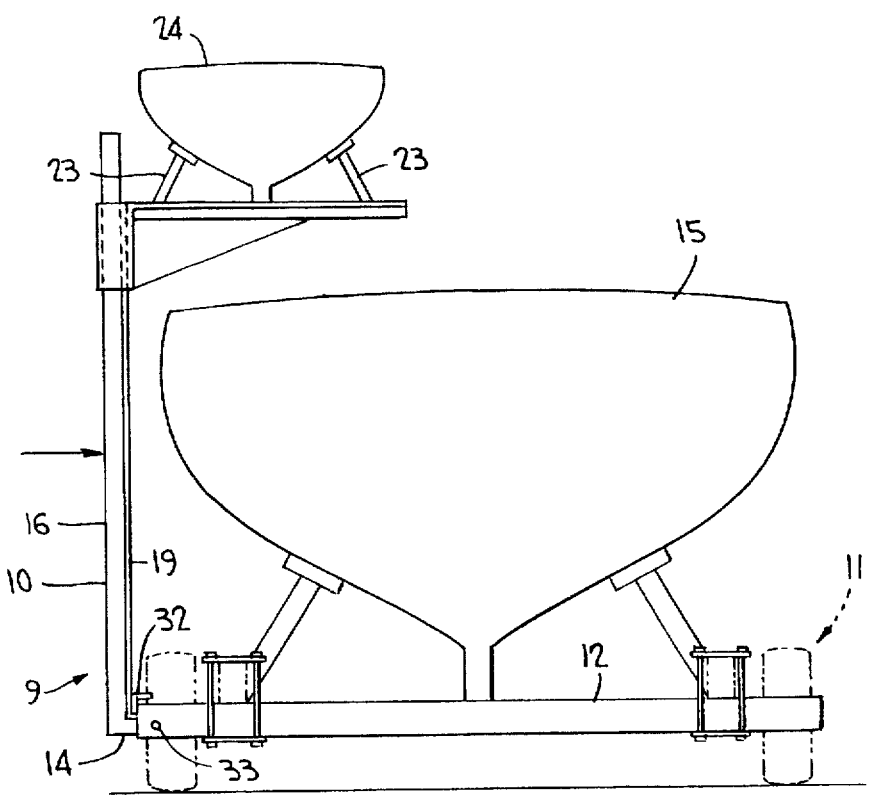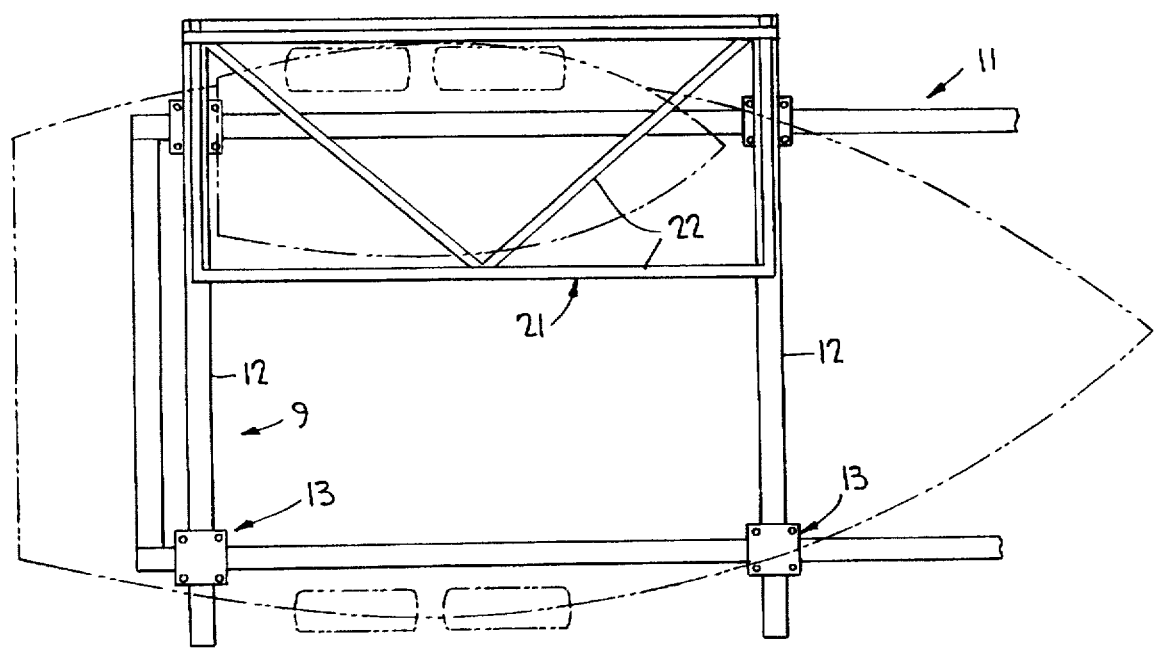

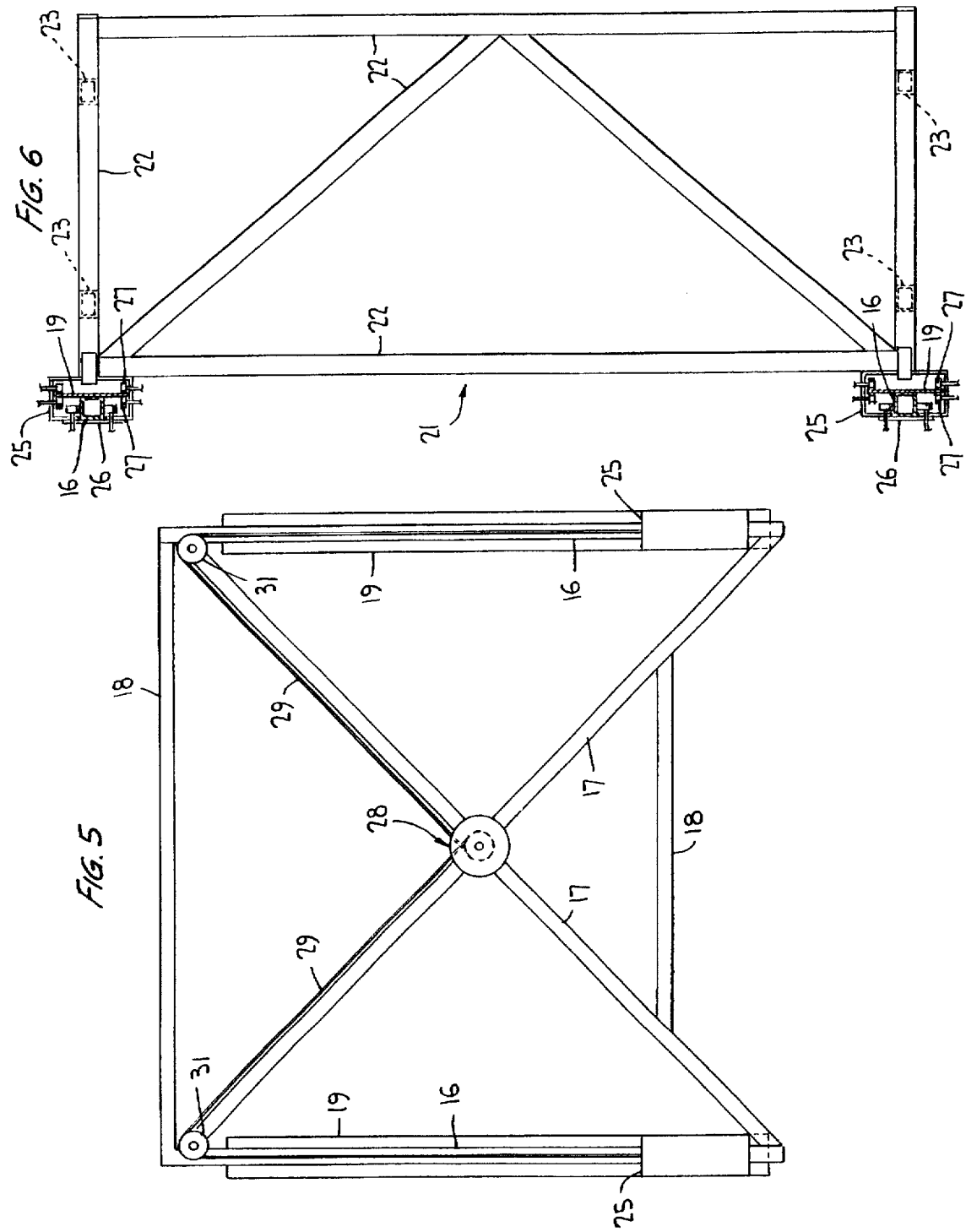

5,704,756

1

TRAILER MOUNTED PERSONAL WATERCRAFT SUPPORT STRUCTURE

RELATED APPLICATION

This application is a non-provisional application claiming benefit of provisional application Ser. No. 60/005,083, filed Oct. 11, 1995.

BACKGROUND OF THE INVENTION

This invention relates generally to structure for supporting personal watercraft on a trailer, and more particularly to such structure mounted to the trailer along a side thereof and movable for supporting the watercraft directly above a boat carried on the trailer. The watercraft can be loaded on to and unloaded from the trailer without the need to unload the boat.

The motorized personal watercraft, such as those sold under the trademarks WAVERIDER, JET SKI, and the like, which may weigh several hundred pounds each, are often transported to and from the launch site using a specialized trailer. Or, these bulky watercraft may be transported between storage and the water launch site using the back of a pick-up truck, or the like.

When transporting by pick-up truck the watercraft must be lowered and lifted manually between the flat bed and the ground/water. Otherwise, a special trailer used for transport only adds to the investment cost of the watercraft owner who may likewise own a boat and a trailer.

It would be advantageous, less costly and more efficient to transport the boat and the personal watercraft on the same trailer.

U.S. Pat. Nos. 4,932,830 and 4,406,477 each disclose automobile trailers adapted to transport both an automobile and a boat behind a towing vehicle. The boat is first elevated to a height above the bed of the automobile trailer sufficient to accommodate the towed automobile. Such specialized automobile trailers are, however, not readily adaptable for transporting a boat and personalized watercraft as in the invention. The automobile must always first be unloaded from the trailer deck before the boat is elevated or lowered relative thereto for loading and unloading. Besides, the automobile trailers themselves must be structurally adapted to support and transport a boat at an upper level by the provision of vertical uprights and bracings.

SUMMARY OF THE INVENTION

It is therefore an object of the present invention to provide a structure which is easily mountable to a standard boat trailer for supporting and transporting a motorized personal watercraft at an elevation above the boat carried in the normal manner on the boat trailer, in a simple and economical yet highly effective manner requiring a minimum number of structural elements.

The support structure according to the invention is mounted to the boat trailer along one side thereof, and comprises a substantially L-shaped bracket movable horizontally toward and away from the trailer. Vertical legs of the bracket support a slidable platform cradling the personal watercraft and movable, in the extended position of the L-shaped bracket, between a loading/unloading position and an elevated intermediate position. When the bracket is shifted toward the trailer, the watercraft is disposed in a storage/transport position above the boat carried on the trailer.

Elongated guides mounted to the undercarriage of the boat trailer engage horizontal legs of the bracket for guiding the bracket during its horizontal movement. And, force multiplying means may be provided for elevating and lowering the platform along the vertical legs.

Other objects, advantages and novel features of the invention will become more apparent from the following detailed description of the invention when taken in conjunction with the accompanying drawings.

BRIEF DESCRIPTION OF THE DRAWINGS

FIG. 1 is an end elevational view of the support structure according to the invention, partly broken away, showing the boat carried on the boat trailer and a personal watercraft located at its loading/unloading position;

FIG. 2 is a view similar to FIG. 1 showing the watercraft at its intermediate position;

FIG. 3 is a view similar to FIG. 1 showing the watercraft at its storage/transport position;

FIG. 4 is a top plan view of the FIG. 3 structure with the boat and watercraft shown in phantom outline;

FIG. 5 view taken substantially along the line 5—5 of FIG. 1; and

FIG. 6 is a view taken substantially along the line 6—6 of FIG. 2

DETAILED DESCRIPTION OF THE INVENTION

Turning now to the drawings wherein like reference characters refer to like and corresponding parts throughout the several views, the support structure according to the invention is generally designated 9 in the drawings, and comprises a substantially L-shaped bracket 10 coupled to a standard boat trailer 11 along one side thereof. Transversely extending, elongated guide supports 12 are clevis or otherwise securely mounted to the underside of the frame of the boat trailer as at 13. Supports 12 may be in the form of hollow rectangular tubes as shown, or of any other suitable shape within the scope of the invention.

The L-shaped bracket 10 includes horizontal legs 14 which may be in telescoping engagement with support tubes 12 to facilitate movement of the bracket toward and away from boat trailer 11, and boat 15 carried thereon, between the FIG. 3 and the FIGS. 1, 2 positions. Anti-friction bearings or rollers (not shown) may be provided between legs 14 and the inner surfaces of tubes 12 to facilitate easier manual sliding movement of the bracket toward and away from the trailer. Such an assembly may be similar to that shown in FIG. 6 to facilitate easier sliding movement of the watercraft platform in the vertical direction.

The L-shaped bracket 10 further includes upright legs 16 which may be of hollow rectangular cross-section and which, as shown in FIG. 5, may be braced together by cross braces 17 and horizontal braces 18, to form a rigid frame. Flat plates 19 are fixed to sides of legs 16 facing the trailer.

A platform, generally designated 21 in FIGS. 1, 2, 3 and 6, is mounted on uprights 16 for sliding movement therealong between the loading/unloading position of FIG. 1 and the elevated intermediate position of FIG. 2. Platform 21, shown in detail in FIG. 6, may comprise a rigid frame of hollow structural bars 22, with or without a top decking. Cradle arms 23 are fixed to the top surface of the frame for cradling motorized personal watercraft 24 upon movement of platform 21 between its FIGS. 1 and 2 positions.

As further shown in FIG. 6, C-shaped brackets 25 are fixed to frame 21 and are telescoped about uprights 16 and plates 19. The open grooves of the C-shaped brackets may be closed by plates 26 fixed in place in some normal manner. And, roller bearings 27 may be mounted within brackets 25 in roller bearing contact with opposite faces of flat plates 19 to facilitate smooth sliding movement of the platform along the uprights. Also, it should be pointed out that horizontal legs 14 are likewise provided with plates 19, and support tubes 12 may have anti-friction rolling bearings mounted therein in roller bearing contact with opposite faces of plates 19, similarly as shown and described in FIG. 6 for the vertical uprights, to facilitate a smoother and easier movement in a horizontal direction of L-shaped bracket 10 between its FIG. 1 and FIG. 3 positions.

Force multiplying means for hoisting the platform supporting the watercraft may be provided on cross-braces 17 which, as shown in FIG. 5, may comprise a manually operated or electrically operated drum/hoist 28 with a typical ratchet locking device (not shown). Cables 29 extend from the hoist about free wheeling pulleys 31 and are secured at some convenient location to C-shaped brackets 25, or to frame bars 22. If the drum/hoist 28 is of the manually operated type, a crank arm (not shown) will be provided. Otherwise, an electrical motor with on and off control (not shown) will be provided for an electrically operated drum/hoist.

The operation of the structure according to the invention will be described assuming that both boat 15 and watercraft 24 are to be transported between storage and the launch site. Bracket 10 is manually, or otherwise, shifted horizontally away from the trailer to the FIG. 1 position, with platform 21 lowered to its FIG. 1 position against stop 32. Watercraft 24 may then be loaded, usually manually, onto platform 21 to be cradled by arms 23. Platform 21 is then elevated to its FIG. 2 position by operation of the drum/hoist thereby elevating the platform and the supported watercraft to an intermediate position. Bracket 10 is then shifted horizontally toward the boat trailer from the FIG. 2 position to that of FIG. 3 such that platform 21 and that the supported watercraft are placed at the transport position directly above boat 15. In the FIGS. 3, 4 position, the boat trailer may be hauled by a towing vehicle (not shown) for transporting both the boat and the personal watercraft from a storage location to the water launch site, or to some other storage site over the road.

When the destination is reached, and it is desirable to unload the watercraft, the aforedescribed operating procedure is simply reversed. Thus, bracket 10 is shifted from its FIG. 3 position away from the trailer to its FIG. 2 position, while platform 21 remains elevated above the boat. The platform is then simply lowered to its unloading position of FIG. 1, and is removed from cradle arms 23, usually manually. If boat 15 is likewise removed from the trailer, bracket 10 may be simply shifted back toward the trailer with platform 21 in its lowermost position such that the unloaded boat trailer can be simply stored temporarily in a limited space, or can be hauled along the open road without being considered a "wide load."

Of course, the personal watercraft 24 may be transported alone utilizing the structure according to the invention, without boat 15. In that event, the personal watercraft is simply loaded to and unloaded from platform 21 in its lowermost position while bracket 10 is in its retracted position, i.e., shifted inwardly toward the trailer.

From the foregoing, it can be seen that the standard boat trailer can be easily adapted for hauling a personal watercraft in addition to a boat by simply mounting elongated guide supports 12 to the undercarriage of the trailer. The boat trailer need not be reconstructed by providing vertical support posts and frames to form an upper deck support for a watercraft or the like, as in the prior art. The structure according to the invention in the form of a substantially L-shaped bracket having vertical and horizontal legs is utilized for supporting a personal watercraft on an elevated platform above the boat during transport, and for facilitating both loading and unloading of the watercraft from the trailer without the need for unloading the boat itself.

Stop pins 33 may be provided by latching horizontal legs 14 in the retracted position of FIG. 3 and in the extended position of FIGS. 1 and 2.

Although this invention has been described as relating to structure for storing and transporting motorized personal watercraft on a boat trailer, it should be pointed out that the structure is not limited to such personal watercraft. The structure according to the invention could likewise support and store crated cargo or the like, or lawn/garden equipment, for example, without departing from the scope of the invention.

Obviously, many modifications and variations of the present invention are made possible in the light of the above teachings. It is therefore to be understood that within the scope of the appended claims the invention may be practiced otherwise than as specifically described.

What is claimed is:

1. Movable structure for supporting a motorized personal watercraft on a boat trailer above a boat carried on the trailer, comprising a substantially L-shaped bracket mountable along a side of the trailer for horizontal movement between a transport/storage position in which a platform on the bracket supporting the watercraft overlies the boat and an elevated intermediate position in which the platform is moved away from the trailer, said bracket having fixed upstanding legs supporting the platform slidably along said legs in a vertical path between said intermediate position and a lowered loading/unloading position, said platform having cradle arms for cradling the personal watercraft upon movement of the bracket and the platform between said positions.

2. The structure according to claim 1, wherein said bracket includes horizontal legs, elongated guide means mountable to the trailer engaged with said horizontal legs for guiding said bracket during said horizontal movement.

3. The structure according to claim 1, further comprising means for moving said platform in said vertical path.

* * * * *